(12) United States Patent
Itakura

(10) Patent No.: US 10,832,494 B2
(45) Date of Patent: Nov. 10, 2020

(54) ATTENDANCE MANAGEMENT DEVICE, ATTENDANCE MANAGEMENT SYSTEM, ATTENDANCE MANAGEMENT METHOD AND STORAGE MEDIUM

(71) Applicant: CASIO COMPUTER CO., LTD., Tokyo (JP)

(72) Inventor: Katsuyuki Itakura, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 296 days.

(21) Appl. No.: 16/000,964

(22) Filed: Jun. 6, 2018

(65) Prior Publication Data
US 2018/0350159 A1    Dec. 6, 2018

(51) Int. Cl.
| | | |
|---|---|---|
| *G06Q 10/10* | (2012.01) | |
| *G07C 1/12* | (2006.01) | |
| *G07G 1/00* | (2006.01) | |
| *G06Q 10/08* | (2012.01) | |
| *G06Q 20/20* | (2012.01) | |
| *G07G 1/14* | (2006.01) | |

(52) U.S. Cl.
CPC ............. *G07C 1/12* (2013.01); *G06Q 10/087* (2013.01); *G06Q 10/1091* (2013.01); *G06Q 20/203* (2013.01); *G06Q 20/206* (2013.01); *G07G 1/0009* (2013.01); *G07G 1/14* (2013.01)

(58) Field of Classification Search
CPC ......... G06Q 10/00; G06Q 10/08; G06F 17/30
See application file for complete search history.

(56) References Cited

U.S. PATENT DOCUMENTS

| | | | | |
|---|---|---|---|---|
| 7,835,955 B1 * | 11/2010 | Brodsky | ............ | G06Q 10/1091 235/377 |
| 8,650,185 B1 * | 2/2014 | Spevacek | ........... | G06Q 10/1053 707/705 |
| 8,768,867 B1 * | 7/2014 | Thaeler | .................. | G06Q 30/02 706/12 |

(Continued)

FOREIGN PATENT DOCUMENTS

| | | |
|---|---|---|
| JP | 2004-355344 A | 12/2004 |
| JP | 2009-129330 A | 6/2009 |
| JP | 2013-003741 A | 1/2013 |

OTHER PUBLICATIONS

Extended European Search Report dated Aug. 3, 2018 received in European Patent Application No. EP 18175870.7.

*Primary Examiner* — Oluseye Iwarere
(74) *Attorney, Agent, or Firm* — Scully Scott Murphy & Presser

(57) ABSTRACT

An attendance management device including a processor which performs control to: display a date and time reception screen for receiving a predetermined operation timing by a user as arrival date and time or leaving date and time; and display a stock input screen for a user to input a stock in a predetermined sales data processing device or a predetermined drawer device, wherein the processor performs control to display the date and time reception screen prior to displaying of the stock input screen when an arrival processing mode is selected, and the processor performs control to display the date and time reception screen after displaying of the stock input screen when a leaving processing mode is selected.

14 Claims, 11 Drawing Sheets

(56) References Cited

U.S. PATENT DOCUMENTS

| | | | |
|---|---|---|---|
| 2002/0030582 A1* | 3/2002 | Depp | G07C 9/28 340/5.53 |
| 2002/0175211 A1* | 11/2002 | Dominquez | G07C 1/10 235/492 |
| 2002/0198758 A1* | 12/2002 | Sawa | G06Q 10/109 709/203 |
| 2003/0171938 A1* | 9/2003 | Lee | H04L 12/1822 709/205 |
| 2005/0033670 A1* | 2/2005 | Cheng | G06Q 10/06398 705/32 |
| 2005/0182698 A1* | 8/2005 | Garcia | G06Q 40/12 705/30 |
| 2008/0296364 A1* | 12/2008 | Pappas | G07C 1/10 235/377 |
| 2008/0306757 A1* | 12/2008 | Morikawa | G06Q 10/083 705/330 |
| 2009/0018887 A1* | 1/2009 | Bank | G06Q 10/109 705/7.13 |
| 2009/0094088 A1* | 4/2009 | Chen | G06Q 10/06314 705/7.19 |
| 2009/0217076 A1* | 8/2009 | Okuhara | G07C 1/10 713/600 |
| 2009/0248553 A1* | 10/2009 | Taylor | G06Q 10/10 705/32 |
| 2011/0010229 A1 | 1/2011 | Ow | |
| 2011/0252097 A1* | 10/2011 | Walker | G06Q 10/06 709/206 |
| 2012/0278211 A1* | 11/2012 | Loveland | G07C 1/10 705/32 |
| 2014/0096140 A1* | 4/2014 | Aquino | G06Q 10/1095 718/103 |
| 2014/0207635 A1* | 7/2014 | Pappas | G06Q 10/109 705/32 |
| 2014/0214471 A1* | 7/2014 | Schreiner, III | G06Q 10/1095 705/7.19 |
| 2015/0088562 A1* | 3/2015 | Woods | G06Q 50/12 705/5 |
| 2015/0199648 A1* | 7/2015 | Yomogida | G06Q 10/1091 705/32 |
| 2016/0171451 A1* | 6/2016 | Pugh | G06Q 10/1093 705/7.18 |
| 2016/0232461 A1* | 8/2016 | Popescu | G06Q 10/04 |
| 2016/0293025 A1* | 10/2016 | Marr | G06Q 10/109 |
| 2016/0307149 A1* | 10/2016 | Jones | G06Q 10/087 |
| 2016/0364687 A1* | 12/2016 | Matson | B25F 5/00 |
| 2017/0091695 A1* | 3/2017 | Inamori | G06F 16/248 |
| 2017/0140326 A1* | 5/2017 | Rhyu | G06Q 10/063 |
| 2017/0185874 A1* | 6/2017 | Sugiyama | G06K 15/022 |
| 2017/0357947 A1* | 12/2017 | Ilan | G06Q 10/06314 |
| 2018/0350159 A1* | 12/2018 | Itakura | G06Q 10/087 |

* cited by examiner

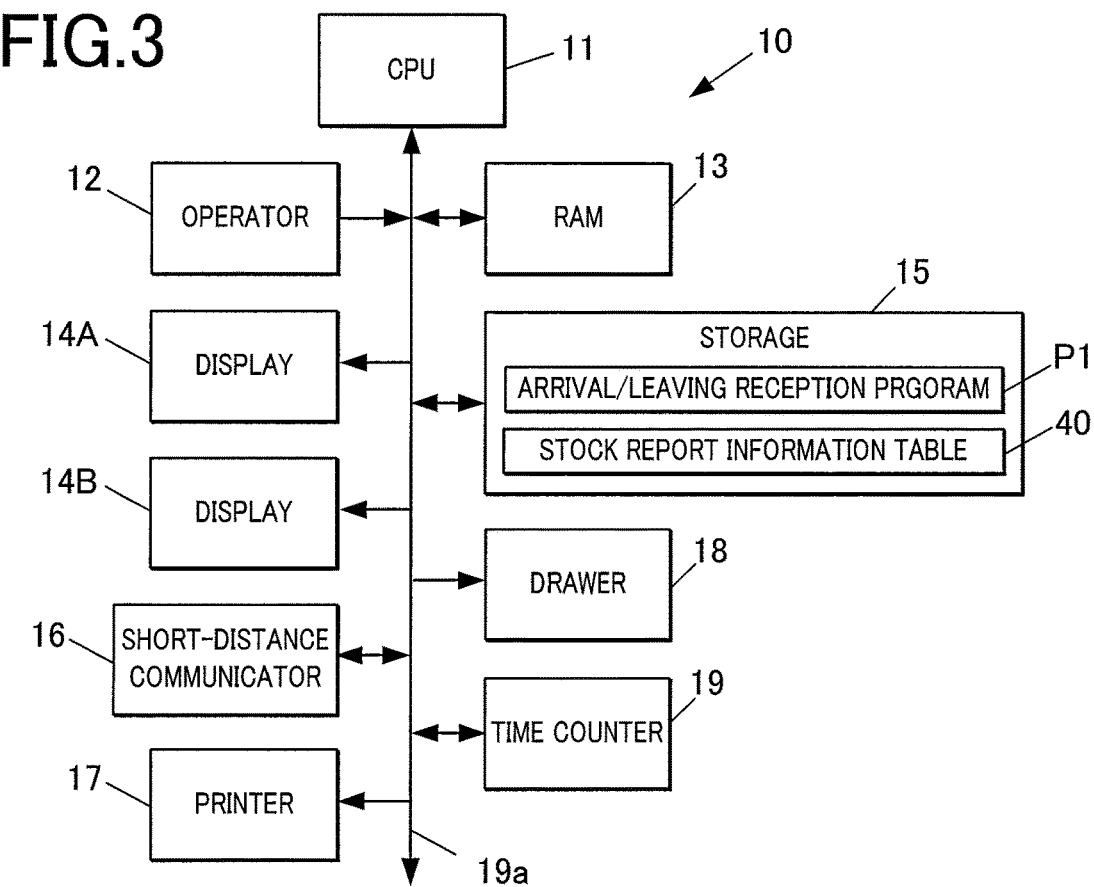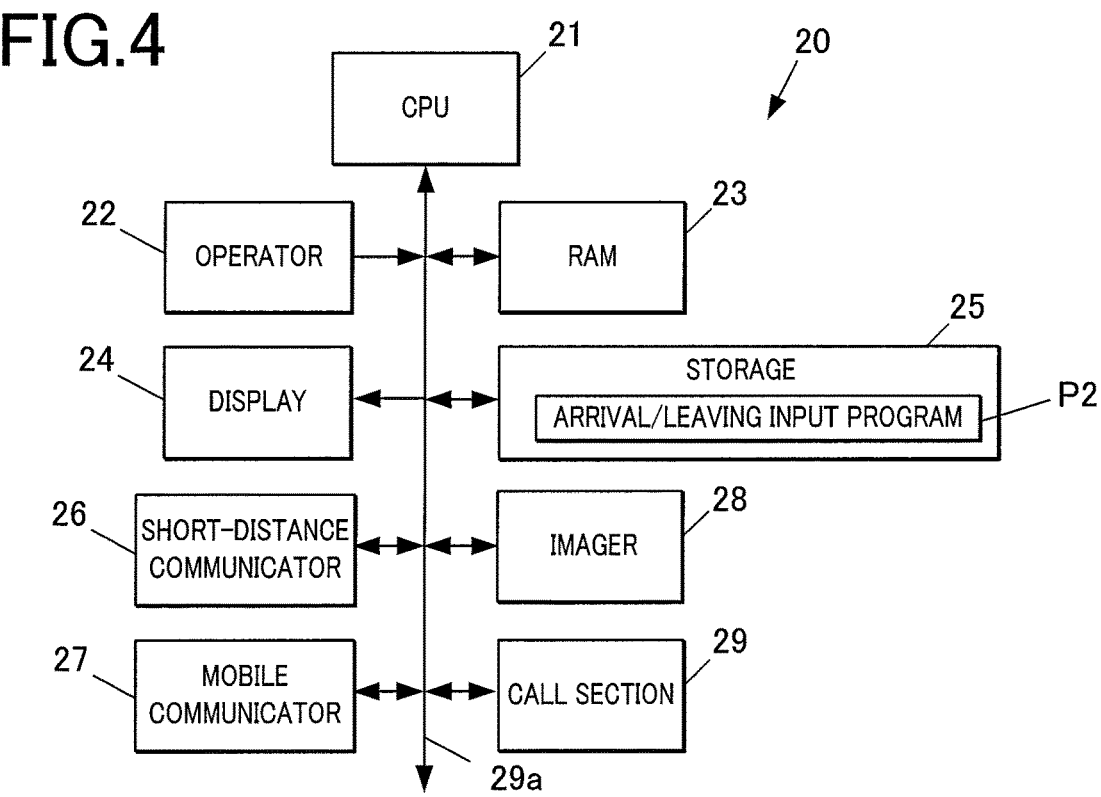

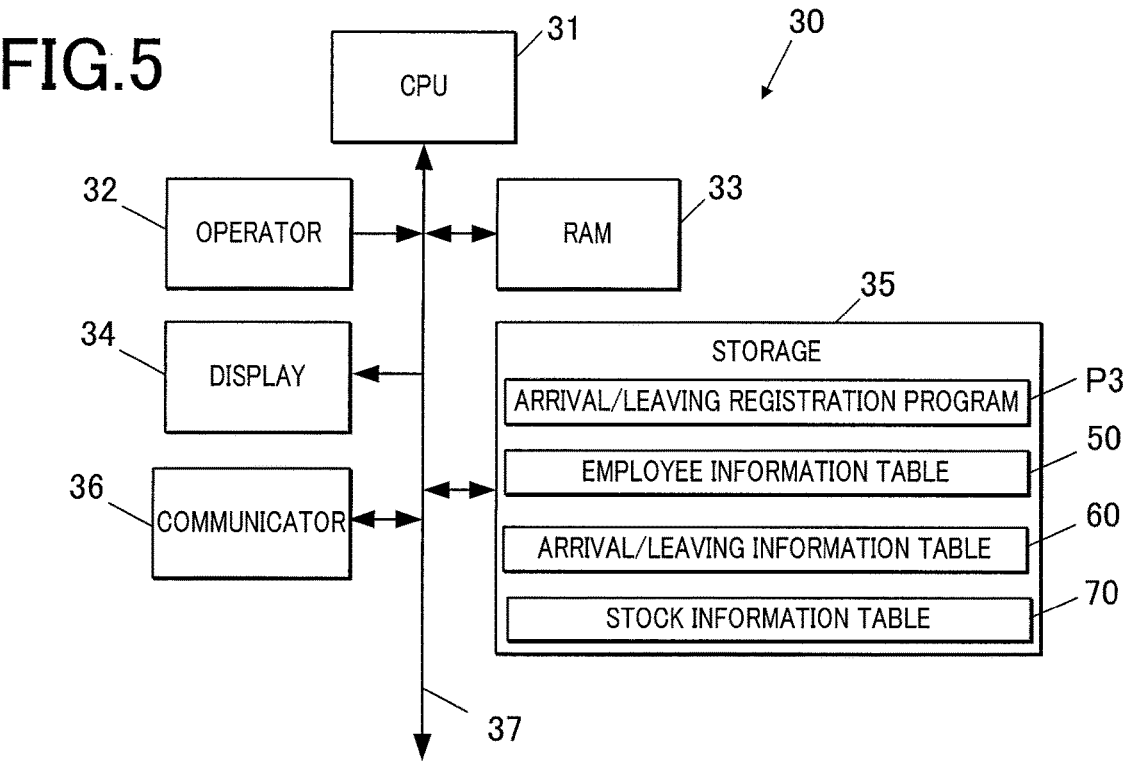

| EMPLOYEE NUMBER | REPORT DATE AND TIME | STOCK REPORT INFORMATION |
|---|---|---|
| : | : | : |

FIG.6B

| EMPLOYEE NUMBER | STOCK REPORT NECESSITY/UNNECESSITY |
|---|---|
| : | : |

FIG.6C

| EMPLOYEE NUMBER | STORE NUMBER | DEVICE NUMBER | ARRIVAL/LEAVING DATE AND TIME | ARRIVAL/LEAVING IDENTIFICATION INFORMATION |
|---|---|---|---|---|
| : | : | : | : | : |

FIG.6D

| EMPLOYEE NUMBER | STORE NUMBER | DEVICE NUMBER | REPORT DATE AND TIME | LOGICAL STOCK INFORMATION | STOCK REPORT INFORMATION |
|---|---|---|---|---|---|
| : | : | : | : | : | : |

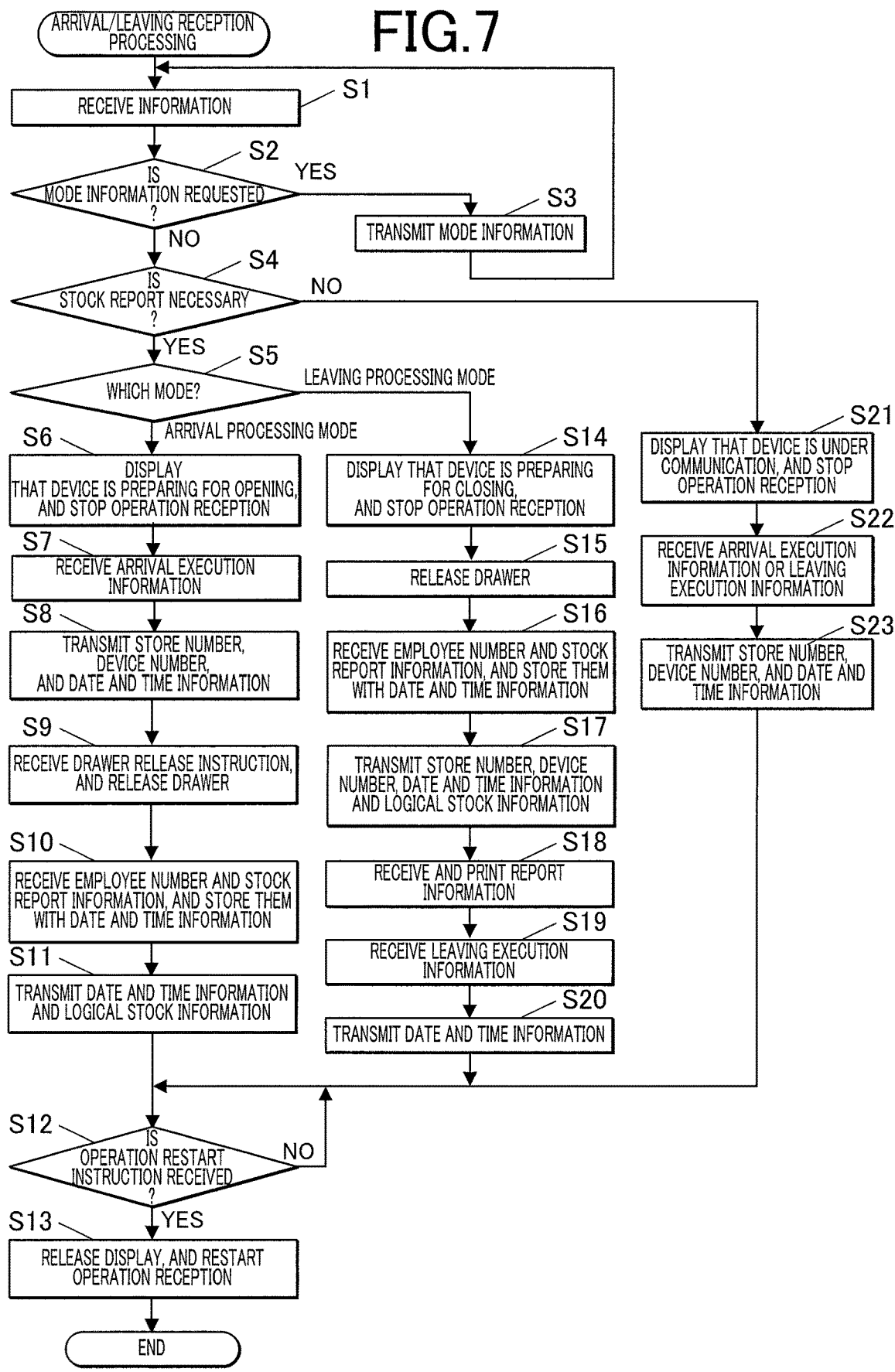

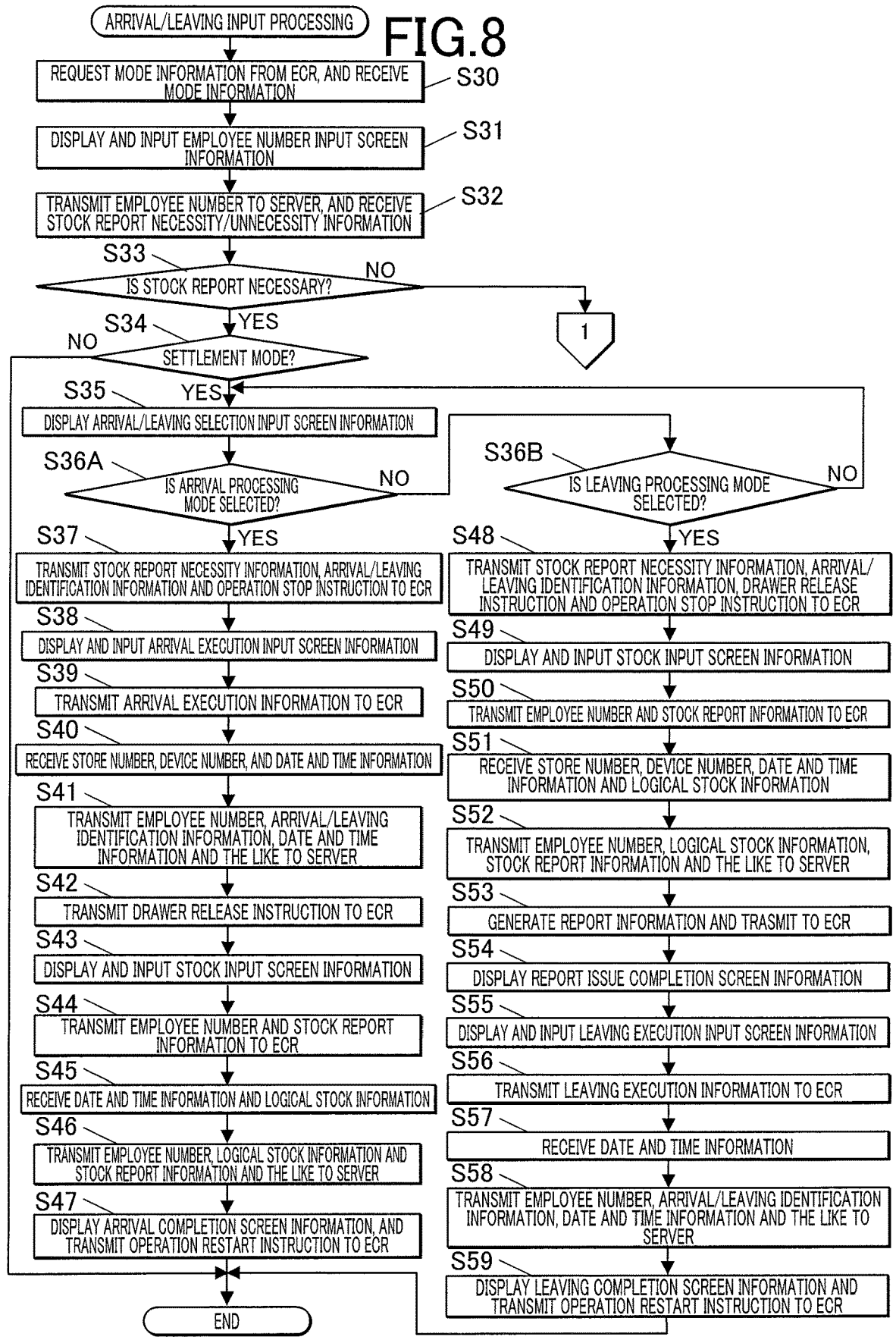

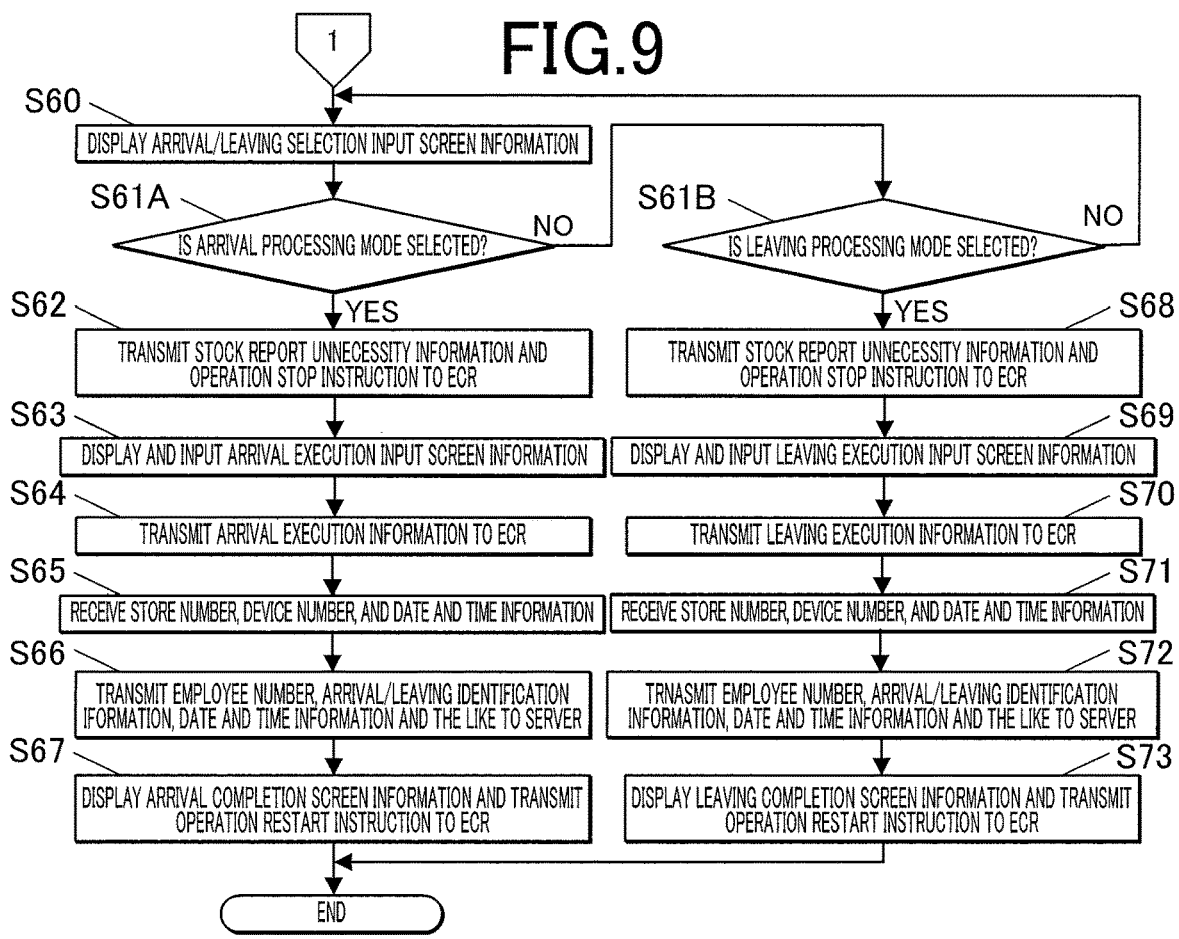
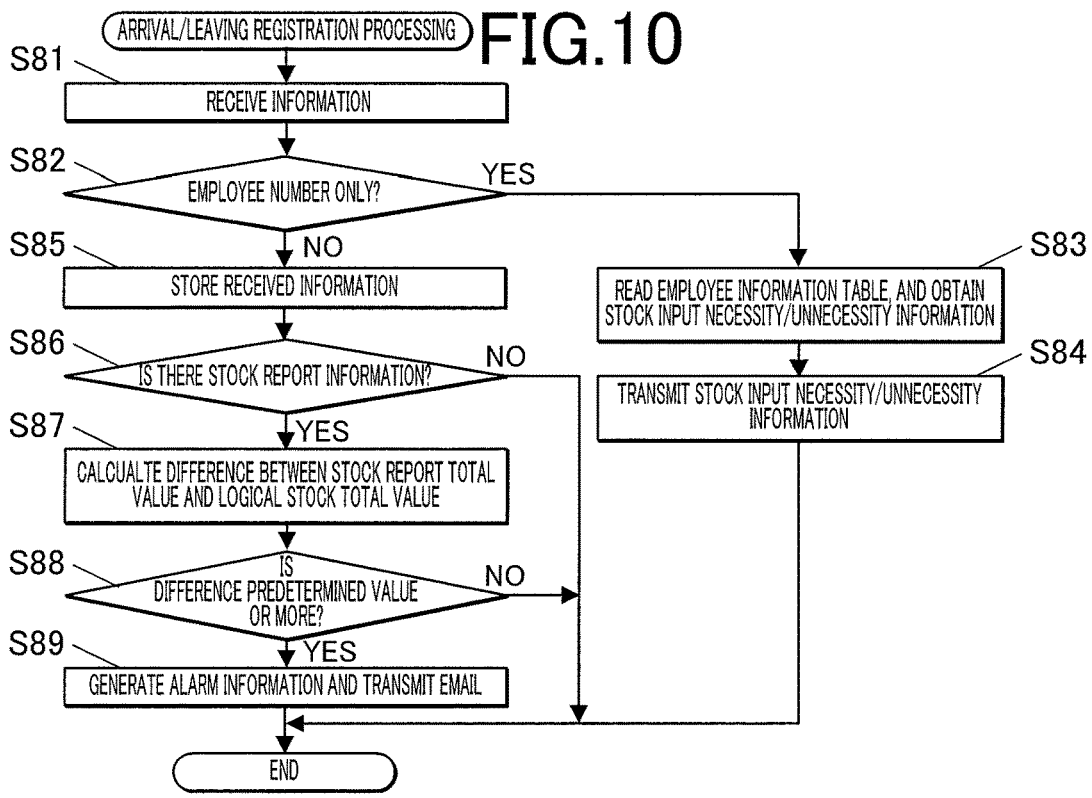

FIG.12A

```
┌─────────────────────────┐ ─100
│  INPUT OF EMPLOYEE NUMBER  101
│  ┌───────────────────┐  │
│  │       1234        │  │
│  └───────────────────┘  │
│                      ─102│
│  ┌─────┬─────┬─────┐    │
│  │  1  │  2  │  3  │    │
│  ├─────┼─────┼─────┤    │
│  │  4  │  5  │  6  │    │
│  ├─────┼─────┼─────┤    │
│  │  7  │  8  │  9  │    │
│  ├─────┼─────┼─────┤    │
│  │     │  0  │  C  │    │
│  └─────┴─────┴─────┘    │
└─────────────────────────┘
```

FIG.12B

```
                          ─110
            ┌──────────────────┐ ─111
            │      ARRIVE      │
            └──────────────────┘
    113 ──── REPORT STOCK    ✓
                               ─112
            ┌──────────────────┐
            │      LEAVE       │
            └──────────────────┘
    114 ──── REPORT STOCK    ✓
```

FIG.13A

```
                        ─120
            ARRIVAL DATE AND TIME ─121
                  ENTER?
                              ─122
            ┌──────────────────┐
            │        OK        │
            └──────────────────┘
                        MARCH 23 7:34
                                ─123
```

FIG.13B

```
                              133
                     ─130
        STOCK INPUT  MARCH 23 7:36
              1YEN  [  20  ]
              5YEN  [  20  ]
             10YEN  [  20  ]
                .    .
                .    .
                .    .
           10000YEN [   1  ]
    MERCHANDISE COUPON [ 1 ]
                     [ OK ]
                132       131
```

ATTENDANCE MANAGEMENT DEVICE, ATTENDANCE MANAGEMENT SYSTEM, ATTENDANCE MANAGEMENT METHOD AND STORAGE MEDIUM

CROSS-REFERENCE TO RELATED APPLICATIONS

The entire disclosure of Japanese Patent Application No. 2017-111291 filed on Jun. 6, 2017 including description, claims, drawings, and abstract are incorporated herein by reference in its entirety.

BACKGROUND OF THE INVENTION

1. Field of the Invention

The present invention relates to an attendance management device, an attendance management system, an attendance management method and a storage medium.

2. Description of Related Art

There have been conventionally known systems for managing arrival and leaving of employees in the workplace. For example, there is known an arrival/leaving time management system in which a password is displayed in the workplace, an employee calls an arrival/leaving time management server by a telephone, and the arrival/leaving time management server registers arrival/leaving time of the employee according to the input of the password via the telephone (for example, see Japanese Patent Application Laid Open Publication No. 2009-129330).

There is also known a system for managing arrival and leaving by connecting a mobile terminal to a device. For example, there is known an attendance management system in which arrival/leaving time of a worker is registered by connecting a mobile phone to a punching data recording device which is installed in the workplace (for example, see Japanese Patent Application Laid Open Publication No. 2004-355344).

Sales data processing devices such as ECRs (Electronic Cash Registers) are installed in stores such as retail stores. It has been required to manage arrival of employees in the workplace in which the sales data processing device is installed.

In addition, there has been a possibility that another person such as a second employee performs arrival/leaving registration by pretending to be a first employee by using the mobile terminal of the first employee in the attendance management system described in Japanese Patent Application Laid Open Publication No. 2004-355344.

SUMMARY OF THE INVENTION

In order to solve the above problems, according to an aspect of the present invention, there is provided an attendance management device including a processor which performs control to: display a date and time reception screen for receiving a predetermined operation timing by a user as arrival date and time or leaving date and time; and display a stock input screen for a user to input a stock in a predetermined sales data processing device or a predetermined drawer device, wherein the processor performs control to display the date and time reception screen prior to displaying of the stock input screen when an arrival processing mode is selected, and the processor performs control to display the date and time reception screen after displaying of the stock input screen when a leaving processing mode is selected.

BRIEF DESCRIPTION OF THE DRAWINGS

The above and other objects, advantages and features of the present invention will become more fully understood from the detailed description given hereinafter and the appended drawings which are given byway of illustration only, and thus are not intended as a definition of the limits of the present invention, and wherein:

FIG. 3 is a block diagram showing a functional configuration of the first ECR;

FIG. 4 is a block diagram showing a functional configuration of a mobile terminal;

FIG. 5 is a block diagram showing a functional configuration of a server;

FIG. 6A is a view showing the configuration of a stock report information table;

FIG. 6B is a view showing the configuration of an employee information table;

FIG. 6C is a view showing the configuration of an arrival/leaving information table;

FIG. 6D is a view showing the configuration of a stock information table;

FIG. 7 is a flowchart showing arrival/leaving reception processing;

FIG. 8 is a flowchart showing arrival/leaving input processing;

FIG. 9 is a flowchart showing the rest of the arrival/leaving input processing in FIG. 8;

FIG. 10 is a flowchart showing arrival/leaving registration processing;

FIG. 12A is a view showing an employee number input screen displayed on a mobile terminal;

FIG. 12B is a view showing a first arrival/leaving selection input screen displayed on the mobile terminal;

FIG. 13A is a view showing an arrival execution input screen displayed on the mobile terminal;

FIG. 13B is a view showing a stock input screen displayed on the mobile terminal;

DETAILED DESCRIPTION OF THE PREFERRED EMBODIMENT

Hereinafter, an embodiment according to the present invention will be described in detail with reference to the accompanying drawings. The present invention is not limited to the illustrated examples.

Figure 1:
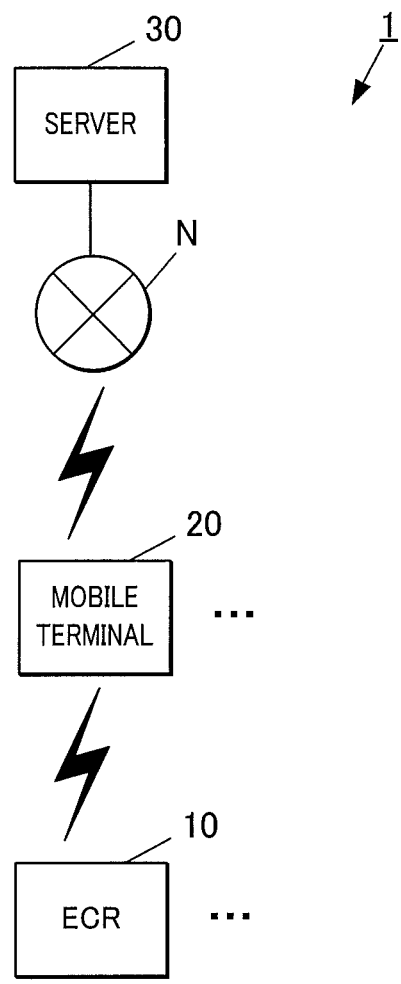
FIG. 1 is a block diagram showing an attendance management system in an embodiment of the present invention.
Figure 2:
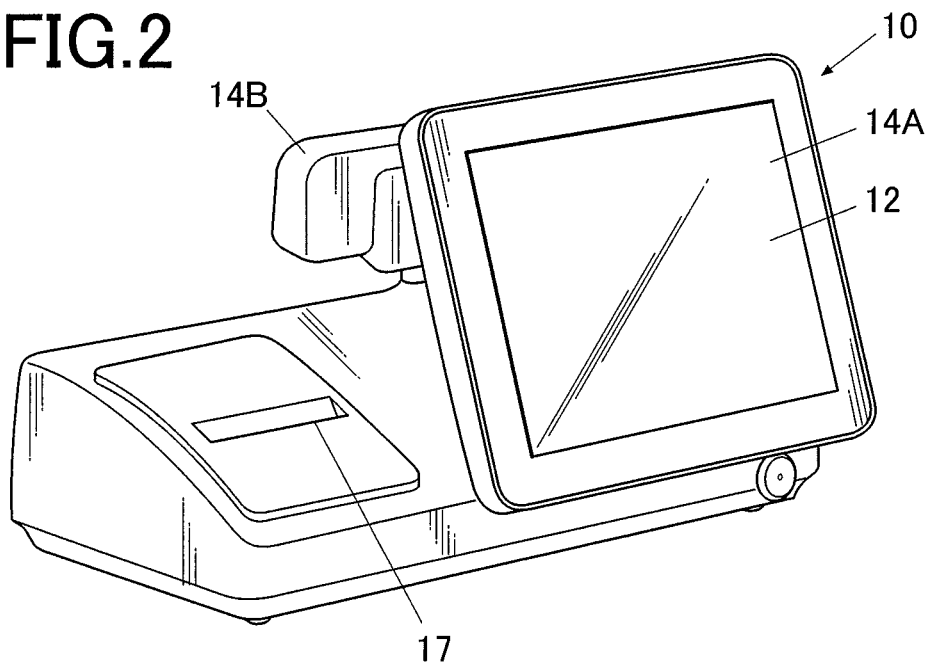
FIG. 2 is an outer view showing a first ECR.

The embodiment according to the present invention will be described with reference to FIGS. 1 to 18. First, the device configuration in the embodiment will be described with reference to FIGS. 1 to 5. FIG. 1 is an outer view showing an attendance management system 1 in the embodiment. FIG. 2 is an outer view showing an ECR 10. FIG. 3 is a block diagram showing the functional configuration of the ECR 10. FIG. 4 is a block diagram showing the functional configuration of a mobile terminal 20. FIG. 5 is a block diagram showing the functional configuration of a server 30.

The attendance management system 1 as an attendance management system in the embodiment is a system for managing arrival/leaving of employees as users in at least one store such as a retail store (a private shop which sells merchandise, for example) or an eating and drinking establishment (a restaurant, for example), and information on stock in the ECR in. As shown in FIG. 1, the attendance management system 1 includes at least one ECR 10 as a sales data processing device, at least one mobile terminal 20 and a server 30. The mobile terminal 20 and the server 30 are connected to each other via a communication network N.

A single ECR 10 is installed in each store in the embodiment, for example. In addition to an owner, a manager and employees (such as full-time workers and part-time workers) other than the manager work in each store, for example. The manager is authorized to perform stock management of the ECR 10 at the time of opening and closing of the store from the owner. The manager is required to report the stock.

In the embodiment, the manager works from opening to closing of the store. The stock management is performed by the manager counting moneys and merchandise coupons in an after-mentioned drawer 18 of the ECR 10 and inputting the counting results to the mobile terminal 20 to transmit stock report information to the server 30 and register the stock report information. All the stores may belong to a same company, each of the stores may belong to a different company, or a combination of the above belonging may be possible.

The ECR 10 receives user's input operation of information on the type of merchandise sold to the customers and the number of each type of merchandise. The ECR 10 calculates and registers the sales data of merchandise on the basis of the information specified by the input operation. The ECR 10 has a function of storing cash received from customers and printing receipts or the like. The sales data processing device in the embodiment is not limited to the ECR 10, and other sales data processing devices such as a POS (Point Of Sales) terminal may be applied.

Each of the employees has a mobile terminal 20. Though the mobile terminal 20 is a smartphone in the embodiment, the present invention is not limited to this. The mobile terminal 20 may be other mobile terminals such as a feature phone, a PDA (Personal Digital Assistant) and a tablet PC (Personal Computer).

The mobile terminal 20 has a mobile communication function such as an LTE (Long Term Evolution) as long-distance wireless communication. The mobile terminal 20 can communicate with a server 30 which is a device on a communication network N via a base station (not shown in the drawings) on a wide-range communication network N by mobile communication. The communication network N is the Internet, for example.

The ECR 10 and the mobile terminal 20 has a communication function of Bluetooth (registered trademark), for example, as short-distance wireless communication. Thus, the mobile terminal 20 and the ECR 10 can communicate with each other by the mobile terminal 20 moving close to the ECR 10. The communication method between the ECR 10 and the mobile terminal 20 is not limited to Bluetooth (registered trademark), and may be other methods of short-distance wireless communication such as wireless LAN (Local Area Network) and NFC (Near Field Communication).

The server 30 is a server device which manages arrival/leaving information of each employee and stock information of each ECR 10 according to the information received from the mobile terminal 20.

As shown in FIG. 2, the ECR 10 includes an operator 12 which is a touch panel, a display 14A for employee in which the touch panel is provided on a display screen, a display 14B which is mainly for a customer, and a printer 17. The display 14A is configured by including an LCD (Liquid Crystal Display), an EL (ElectroLuminescent) display or the like, and has a relatively large display screen capable of displaying various types of screen information such as sales data registration screen information of merchandise for a store staff. The display 14B is configured by including an LCD, an EL display or the like, and the display screen can rotate to the customer side or the store staff side and is a relatively small screen mainly displaying information for the customer such as each price of menu and the total price.

The printer 17 is a printer such as a thermal printer which prints printing information such as receipt data and electronic journal data onto a sheet such as roll paper.

As shown in FIG. 3, the ECR 10 includes a CPU (Central Processing Unit) 11, an operator 12, a RAM (Random Access Memory) 13, displays 14A and 14B, a storage 15, a short-distance communicator 16, a printer 17, a drawer 18 and a time counter 19. The components in the ECR 10 are connected to each other via a bus 19a. In FIG. 2, illustration of the drawer 18 is omitted.

The CPU 11 controls the components in the ECR 10. The CPU 11 reads out a program which was specified from among various programs from the storage 15, loads the program into the RAM 13 and executes various types of processing in cooperation with the loaded program.

The operator 12 is a touch panel which is provided on a display screen of the display 14A, receives touch input from a user and outputs the operation information to the CPU 11. The operator 12 is, for example, a resistance film type touch panel. However, the operator 12 is not limited to this, and may be other types such as a capacitance type and electromagnetic induction type. The operator 12 receives touch input to various soft keys, for example. The operator 12 may have a hard key.

The RAM 13 is a volatile memory, and forms a working area for storing various types of data and programs. The displays 14A and 14B display various types of display information on the display screens under control by the CPU 11.

The storage 15 is a storage which is capable of writing and reading of information, and configured by including a RAM subjected to battery backup, a flash memory, an EEPROM (Electrically Erasable Programmable Read Only Memory) or the like. The storage 15 stores various programs such as an arrival/leaving reception program P1 and various types of data such as a stock report information table 40, a store number which is identification information on a store in which the ECR 10 itself is installed, a device number which is identification information on the ECR 10 itself, sales data of merchandise and logical stock information to be described later.

The short-distance communicator 16 is a wireless communicator in a communication method of Bluetooth (registered), and performs wireless communication with a device located in a short distance. The short-distance communicator 16 performs, for example, wireless communication with the mobile terminal 20 which was moved close in the short distance. Thus, the CPU 11 can transmit and receive information to and from the mobile terminal 20 via the short-distance communicator 16.

The printer 17 prints data of receipt, electronic journal and the like on sheets under control by the CPU 11. The drawer 18 is a drawer storing moneys, merchandise coupons and the like, and has a releasing mechanism which releases a drawer under control by the CPU 11.

The time counter 19 is a real time clock, counts current date and time and outputs the current date and time information to the CPU 11.

The ECR 10 may be configured by including other functional sections such as an electronic payment section for performing electronic payment by reading a credit card, and a scanner section such as a laser scanner or an image scanner which reads a barcode provided on the merchandise.

As shown in FIG. 4, the mobile terminal 20 includes a CPU 21 as a processor, an operator 22, a RAM 23, a display 24, a storage 25, a short-distance communicator 26, a mobile communicator 27, an imager 28 and a call section 29. The components in the mobile terminal 20 are connected to each other via a bus 29a.

The CPU 21, the operator 22, the RAM 23, the display 24 and the short-distance communicator 26 are similar to the CPU 11, the operator 12, the RAM 13, the display 14A and the short-distance communicator 16 in the ECR 10, respectively. The CPU 21 controls each of the components in the mobile terminal 20. The display 24 is a display which has a display screen having a size for a smartphone. The CPU 21 can transmit and receive information to and from the ECR 10 via the short-distance communicator 26.

The storage 25 is a storage which is capable of writing and reading of information and configured by including a flash memory, an EEPROM or the like. The storage 15 stores various programs such as an arrival/leaving input program P2 and various types of data.

The mobile communicator 27 is a wireless communicator of a communication type of mobile communication such as an LTE, and performs wireless communication with a base station (not shown in the drawings) on the communication network N. Thus, the CPU 21 can transmit and receive information to and from the server 30 which serves as a device on the communication network N via the mobile communicator 27, the base station and the communication network N.

The imager 28 is a digital camera such as a CCD (Charge Coupled Device) or a CMOS (Complementary Metal Oxide Semiconductor), and captures a subject to generate image data under control by the CPU 11.

The call section 29 includes a microphone, an amplifier, a speaker and the like. Under control by the CPU 11, the call section 29 converts voice of a user during call into a sound signal, and outputs sound by amplifying a sound signal from the call destination.

As shown in FIG. 5, the server 30 includes a CPU 31, an operator 32, a RAM 33, a display 34, a storage 35 and a communicator 36. The components of the server 30 are connected to each other via a bus 37.

The CPU 31, the RAM 33 and the display 34 are similar to the CPU 11, the RAM 13 and the display 14A in the ECR 10. The CPU 31 controls each of the components in the server 30. The display 34 is a display having a display screen of a size for a server.

The storage 35 is a storage which is capable of writing and reading of information, and configured by including an HDD (Hard Disk Drive), an SSD (Solid State Drive) or the like. The storage 35 stores various programs such as an arrival/leaving registration program P3, and various types of data such as an employee information table 50, an arrival/leaving information table 60, a stock information table 70 and an email address of an owner of the store.

The communicator 36 is configured by including a network card or the like, connected to the communication network N and performs communication with a device on the communication network N. The CPU 31 can transmit and receive information to and from the mobile terminal 20 via the communicator 36 and the communication network N (and the base station).

With reference to FIGS. 6A to 6D, data stored in the attendance management system 1 will be described. FIG. 6A is a view showing the configuration of a stock report information table 40. FIG. 6B is a view showing the configuration of an employee information table 50. FIG. 6C is a view showing the configuration of an arrival/leaving information table 60. FIG. 6D is a view showing the configuration of a stock information table 70.

The stock report information table 40 stored in the storage 15 of the ECR 10 is a table of information regarding stock report of a drawer 18 of the ECR 10 itself. As shown in FIG. 6A, the stock report information table 40 has fields of an employee number 41, report date and time 42 and stock report information 43.

The employee number 41 is identification information unique to the employee who performed stock report of the stock report information 43. The employee number 41 is an employee number of a manager having authority of stock management. The report date and time 42 is date and time information regarding date and time when the employee of the employee number 41 performed report of the stock report information 43.

The stock report information 43 is content information regarding the contents of stock report which was performed by the employee of the employee number 41 at the report date and time 42. The stock report information 43 includes: each number of moneys (one-yen coin, five-yen coin, ten-yen coin, fifty-yen coin, hundred-yen coin, five-hundred-yen coin, thousand-yen bill, five-thousand-yen bill and ten thousand-yen bill) and merchandise coupons in the drawer 18 of the ECR 10; a stock report total value which is the total amount of money of the above moneys and merchandise coupons, a cash stock report value which is the total amount of money of only the moneys (cash) and a merchandise coupon stock report value which is the total amount of money of only the merchandise coupons.

The employee information table 50 stored in the storage 35 of the server 30 is a table having information regarding stock report by employees in all the stores. As shown in FIG. 6B, the employee information table 50 has fields of an employee number 51 and stock report necessity/unnecessity 52.

The employee number 51 is identification information of each of all the employees in all the stores. The stock report necessity/unnecessity 52 is information indicating necessity/unnecessity of the stock report by the employee of the employee number 51. The stock report necessity/unnecessity 52 for a manager is information indicating that stock report is necessary and the stock report necessity/unnecessity 52 for an employee other than the manager is information indicating that stock report is not necessary.

The arrival/leaving information table 60 stored in the storage 35 in the server 30 is a table having information regarding arrival/leaving of employees in all the stores. As shown in FIG. 6C, the arrival/leaving information table 60 has fields of an employee number 61, a store number 62, a device number 63, arrival/leaving date and time 64 and arrival/leaving identification information 65.

The employee number 61 is identification information of each of all the employees of all the stores. The store number 62 is identification information of the store which the employee of the employee number 61 arrived at or left. The device number 63 is identification information of the ECR 10 to which arrival/leaving was input, the arrival/leaving being arrival/leaving regarding the store of the store number 62 which the employee of the employee number 61 arrived at or left. The arrival/leaving date and time 64 is date and time information regarding the date and time when the employee of the employee number 61 arrived at or left the store. The arrival/leaving identification information 65 is identification information of arrival/leaving as the operation of the employee of the employee number 61. The arrival/leaving identification information 65 has two types of arrival and leaving.

The stock information table 70 stored in the storage 35 of the server 30 is a table having information regarding stock which was reported by the employees having authority in all the stores. As shown in FIG. 6D, the stock information table 70 has fields of an employee number 71, a store number 72, a device number 73, a report date and time 74, logical stock information 75 and stock report information 76.

The employee number 71 is identification information of the employee who reported the stock. The store number 72 is identification information of the store provided with the ECR 10 to which the employee of the employee number 71 performed stock report. The device number 73 is identification information of the ECR 10 provided in the store of the store number 62 to which the employee of the employee number 71 performed stock report. The report date and time 74 is date and time information regarding date and time when the employee of the employee number 71 performed stock report.

The logical stock information 75 is information regarding logical stock corresponding to the stock report information 76 for which the employee of the employee number 71 performed stock report. The logical stock information is stock information in the drawer 18 of the ECR 10, which is logical information obtained by addition of sales data of the merchandise and the like for the store after the previous stock report. The logical stock information 75 includes: a logical stock total value which is a total value of the amount of money of the moneys and merchandise coupons that should be stored in the drawer 18 of the ECR 10; a cash logical stock value which is a total value of the amount of money of only the moneys (cash) among the above moneys and merchandise coupons; and a merchandise coupon logical stock value which is a total value of the amount of money of only the merchandise coupons among the above moneys and merchandise coupons. The stock report information 76 is the content information regarding the contents of the stock report which was performed by the employee of the employee number 71.

The CPU 11 updates the logical stock information stored in the storage 15 by appropriately calculating latest logical stock information which is obtained by addition of the update of sales data from the stock report information 43 of the latest report date and time 42 in the stock report information table 40 according to the update (merchandise registration) of sales data.

Figure 11:
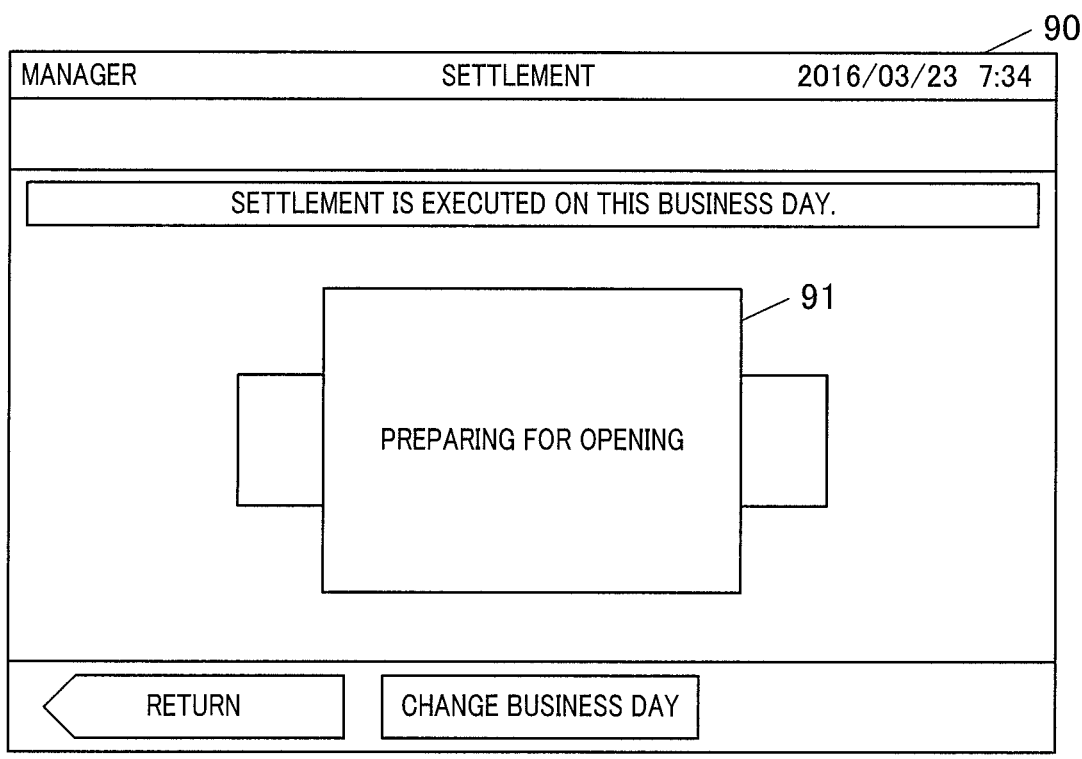
FIG. 11 is a view showing a display screen displayed in the ECR.
Figure 14A:
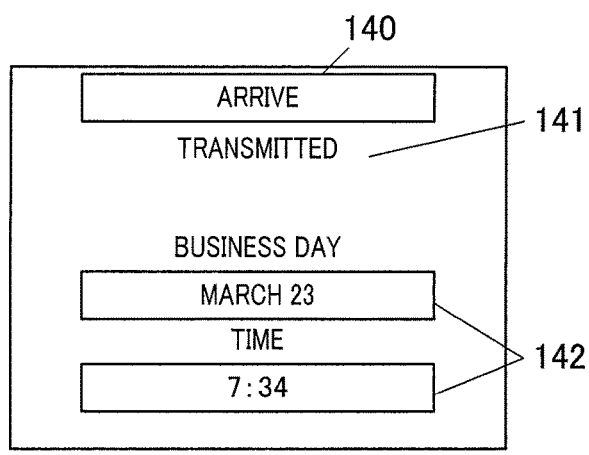
FIG. 14A is a view showing an arrival completion screen displayed on the mobile terminal.
Figure 14B:
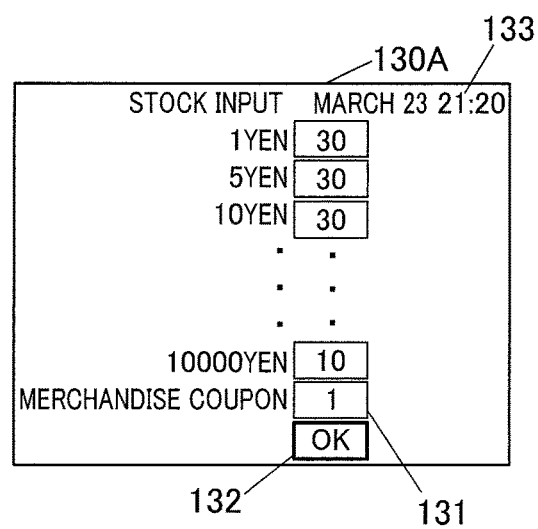
FIG. 14B is a view showing a stock input screen displayed on the mobile terminal.
Figure 15A:
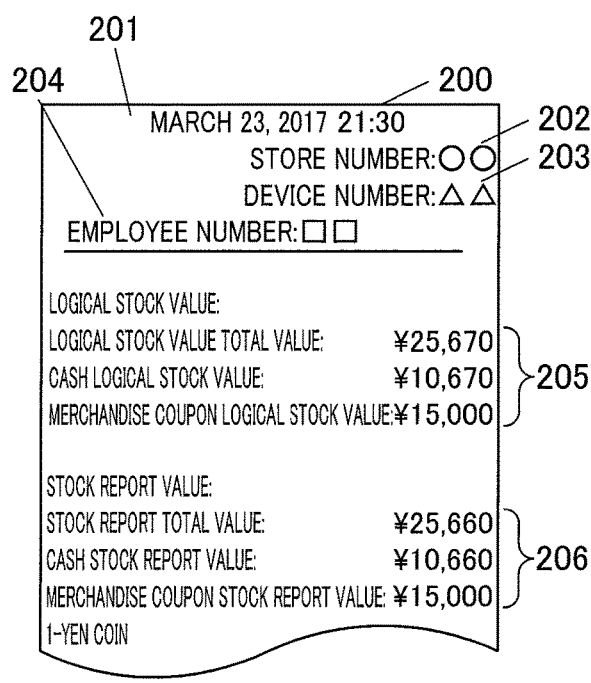
FIG. 15A is a view showing a report.
Figure 15B:
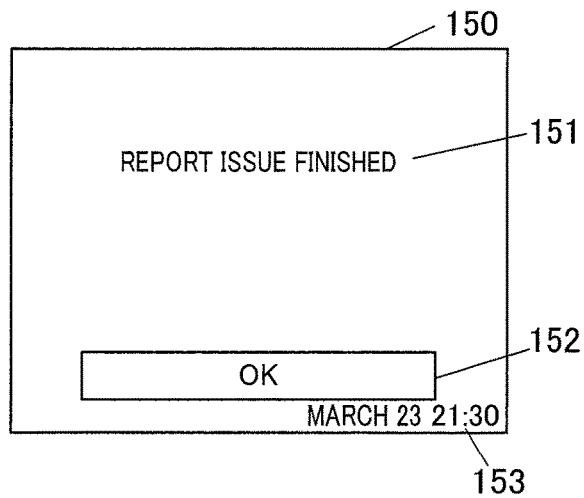
FIG. 15B is a view showing a report issue completion screen displayed on the mobile terminal.
Figure 16A:
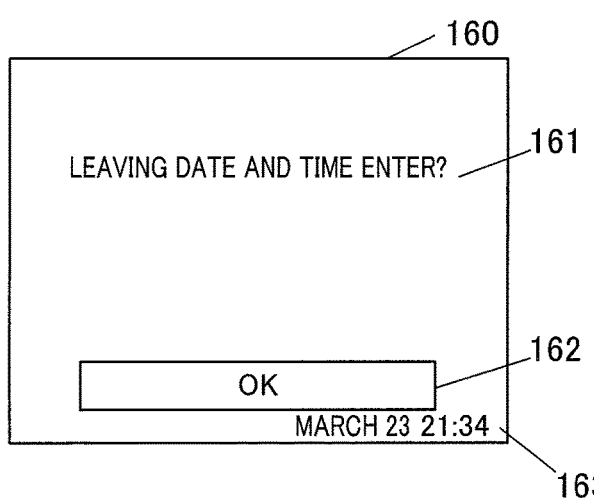
FIG. 16A is a view showing a leaving execution input screen displayed on the mobile terminal.
Figure 16B:
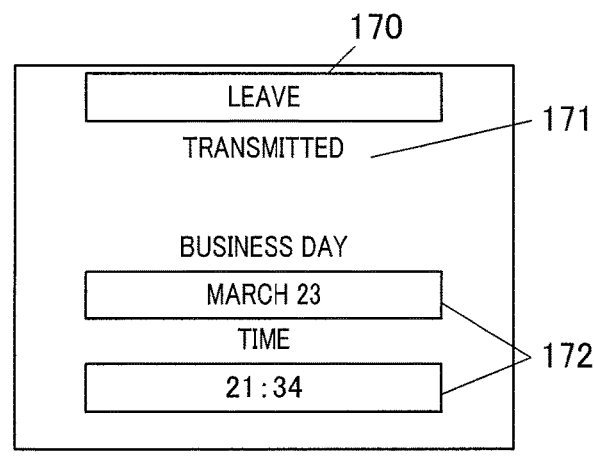
FIG. 16B is a view showing a leaving completion screen displayed on the mobile terminal.
Figure 17:
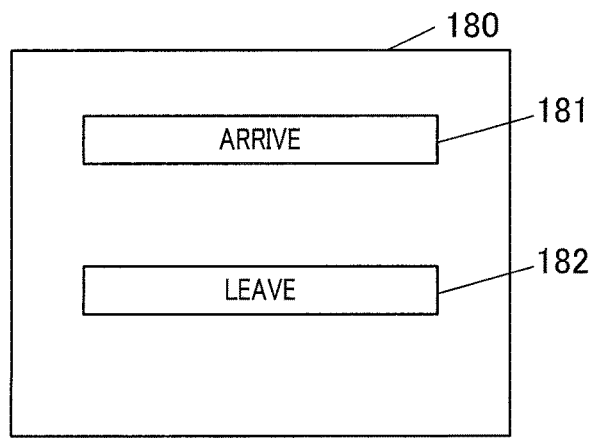
FIG. 17 is a view showing a second arrival/leaving selection input screen displayed on the mobile terminal.

Next, the operation of the attendance management system 1 will be described with reference to FIGS. 7 to 17. FIG. 7 is a flowchart showing arrival/leaving reception processing. FIG. 8 is a flowchart showing arrival/leaving input processing. FIG. 9 is a flowchart showing the rest of the arrival/leaving input processing in FIG. 8. FIG. 10 is a flowchart showing arrival/leaving registration processing. FIG. 11 is a view showing a display screen 90 displayed in the ECR 10. FIG. 12A is a view showing an employee number input screen 100 displayed on the mobile terminal 20. FIG. 12B is a view showing an arrival/leaving selection input screen 110 displayed on the mobile terminal 20. FIG. 13A is a view showing an arrival execution input screen 120 displayed on the mobile terminal 20. FIG. 13B is a view showing a stock input screen 130 displayed on the mobile terminal 20. FIG. 14A is a view showing an arrival completion screen 140 displayed on the mobile terminal 20. FIG. 14B is a view showing a stock input screen 130A displayed on the mobile terminal 20. FIG. 15A is a view showing a report 200. FIG. 15B is a view showing a report issue completion screen 150 displayed on the mobile terminal 20. FIG. 16A is a view showing a leaving execution input screen 160 displayed on the mobile terminal 20. FIG. 16B is a view showing a leaving completion screen 170 displayed on the mobile terminal 20. FIG. 17 is a view showing an arrival/leaving selection input screen 180 displayed on the mobile terminal 20.

Here, it is assumed that the employee has already installed the arrival/leaving input program P2 as an application (application program) into the mobile terminal 20 which is carried by himself/herself in the attendance management system 1. When arriving at or leaving the store, the employee moves the mobile terminal 20 close to the ECR 10 in a distance capable of short-distance wireless communication in the store, and registers the arrival or leaving by operating the mobile terminal 20. At this time, in a case where the employee is a manager, the employee is required to perform stock report at the time of registration of the arrival and leaving.

Various modes can be selected and set in the ECR 10 by the employee's input via the operator 12. For example, there can be selected and set a registration mode of performing registration of sales data at the time of selling merchandise, a settlement mode of performing settlement of sales, a setting mode of performing various settings, a check mode of checking the register, a return mode of returning merchandise, an off mode at the time of not using the ECR 10, and the like. Since stock report accompanies the arrival/leaving of the manager, processing regarding arrival/leaving for the manager is performed in the settlement mode. The mode of performing processing regarding the arrival is referred to as an arrival processing mode, and the mode of performing processing regarding the leaving is referred to as a leaving processing mode. Since the stock report does not accompany the arrival/leaving of employees other than the manager, the processing (arrival processing mode and leaving processing mode) regarding arrival/leaving for the employees other than the manager can be performed in any mode.

First, with reference to FIG. 7, arrival/leaving reception processing executed in the ECR 10 will be described. The arrival/leaving reception processing is processing of transmitting information required for registration of arrival/leaving and stock report to the mobile terminal 20, and receiving the stock report information from the mobile terminal 20 and storing the received stock report information. It is assumed here that the employee who arrived at or left the store has executed in advance arrival/leaving input processing to be described later by using the mobile terminal 20.

In the ECR 10, for example, in response to the start of receiving information from the mobile terminal 20 via the short-distance communicator 16 as a trigger, the CPU 11 executes arrival/leaving reception processing in cooperation with the arrival/leaving reception program P1 which was read out from the storage 15 and loaded onto the RAM 13 appropriately.

First, the CPU 11 completes reception of information from the mobile terminal 20 via the short-distance communicator 16 (step S1). The received information is any one of a mode information request, stock report necessity information, arrival/leaving identification information and an operation stop instruction, stock report necessity information, arrival/leaving identification information, a drawer release instruction and an operation stop instruction, and stock report unnecessity information and an operation stop instruction. The stock report necessity information is information corresponding to arrival/leaving of a manager and indicating that stock report is necessary. The stock report unnecessity information is information corresponding to arrival/leaving of employees other than the manager, and indicating that the stock report is not necessary. The arrival/leaving identification information is identification information indicating arrival (arrival processing mode) or leaving (leaving processing mode). The mode information request is a request for mode information indicating the current mode of the ECR 10. The drawer release instruction is instruction information to release the drawer 18. The operation stop instruction is instruction information to stop reception of the operation input via the operator 12.

The CPU 11 determines whether the information received in step S1 is the mode information request (step S2). If the information is the mode information request (step S2; YES), the CPU 11 transmits the mode information on the current mode of the ECR 10 of itself to the mobile terminal 20 via the short-distance communicator 16 (step S3), and proceeds to step S1.

If the information is not the mode information request (step S2; NO), the CPU 11 determines whether the stock report is necessary on the basis of the stock report necessity information or the stock report unnecessity information which is included in the information received in step S1 (step S4). If the stock report necessity information is received, the stock report is necessary, and if the stock report unnecessity information is received, the stock report is not necessary.

If the stock report is necessary (step S4; YES), the CPU 11 determines whether the mode will shift to the arrival processing mode or the leaving processing mode on the basis of the arrival/leaving identification information included in the information received in step S1 (step S5). If the mode will shift to the arrival processing mode (step S5; arrival processing mode), the CPU 11 shifts to the arrival processing mode, displays display screen information including "preparing for opening" on the display 14A, and sets stop of the reception of operation via the operator 12 according to the operation stop instruction received in step S1 (step S6). In step S6, for example, the display screen 90 shown in FIG. 11 corresponding to the display screen information is displayed on the display 14A. The display screen 90 has a dialog 91 on the background of the settlement mode. The dialog 91 includes the characters of "preparing for opening". Various operation inputs such as mode switching and registration of merchandise (sales data) via the operator 12 by the employee are disabled.

The CPU 11 receives the arrival/leaving execution information indicating arrival execution from the mobile terminal 20 via the short-distance communicator 16 (step S7). The CPU 11 obtains the current date and time information from the time counter 19, reads the store number and the device number from the storage 15 and transmits the read store number and device number and the obtained current date and time information as the time of arrival execution to the mobile terminal 20 via the short-distance communicator 16 (step S8).

The CPU 11 receives a drawer release instruction from the mobile terminal 20 via the short-distance communicator 16, and releases the drawer 18 according to the drawer release instruction (step S9). Step S9 is for automatically releasing the drawer 18 for calculating the stock at the time of stock report by the employee (manager).

The CPU 11 receives the employee number and the stock report information from the mobile terminal 20 via the short-distance communicator 16, obtains the current date and time information from the time counter 19 and stores the employee number, stock report information and the obtained current date and time information as the stock report time on arrival in the stock report information table 40 of the storage 15 (step S10). In step S10, the obtained employee number, stock report information and the current date and time information are added to a same record of the employee number 41, the stock report information 43 and the repot date and time 42 in the stock report information table 40.

The CPU 11 reads out the logical stock information from the storage 15 and transmits the date and time information obtained in step S10 and the read logical stock information to the mobile terminal 20 via the short-distance communicator 16 (step S11). In steps S6 to S11, the CPU 11 obtains date and time information for display of arrival execution input screen information and stock input screen information to be described later from the time counter 19 as needed (for example, every one minute), and transmits the obtained date and time information for display to the mobile terminal 20 via the short-distance communicator 16.

The CPU 11 determines whether the operation restart instruction was received from the mobile terminal 20 via the short-distance communicator 16 (step S12). If the operation restart instruction is not received (step S12; NO), the CPU 11 proceeds to step S12.

If the operation restart instruction is received (step S12; YES), the CPU 11 cancels display of characters (dialog) in steps S6, S14 and S21, restarts the operation reception via the operator 12 (step S13), and ends the arrival/leaving reception processing. Various operation inputs by the employee via the operator 12 become allowed.

If the mode will shift to the leaving processing mode (step S5; leaving processing mode), the CPU 11 proceeds to the leaving processing mode, displays the display screen information including "preparing for closing" on the display 14A, and sets stop of the operation reception via the operator 12 according to the operation stop instruction received in step S1 (step S14). In step S14, for example, there is displayed on the display 14A the display screen including the characters of "preparing for closing" in the dialog 91 of the display screen 90 shown in FIG. 11 as the display screen information.

The CPU 11 releases the drawer 18 according to the drawer release instruction received in step S1 similarly to step S9 (step S15). Step S16 is similar to step S10. The date and time information in step S16 is date and time information at the time of stock report in leaving.

The CPU 11 reads out the store number, the device number and the logical stock information from the storage 15 and transmits the read store number, device number and logical stock information and the date and time information obtained in step S16 to the mobile terminal 20 via the short-distance communicator 16 (step S17).

The CPU 11 receives report information of stock report including the employee number, store number, the device number, the date and time information, the logical stock information and the stock report information from the mobile terminal 20 via the short-distance communicator 16, and prints the received report information onto a sheet as report with the printer 17 (step S18). The CPU 11 receives leaving execution information indicating the leaving execution from the mobile terminal 20 via the short-distance communicator 16 (step S19). The CPU 11 obtains the current date and time information from the time counter 19, and transmits the current date and time information as the leaving execution time to the mobile terminal 20 via the short-distance communicator 16 (step S20), and proceeds to step S12. In steps S14 to S20, the CPU 11 obtains date and time information for displaying in the after-mentioned stock input screen information and leaving execution screen information from the time counter 19 as needed (for example, every one minute), and transmits the obtained date and time information for display to the mobile terminal 20 via the short-distance communicator 16.

If the stock report is not necessary (step S4; NO), the CPU 11 displays the display screen information including "under communication" on the display 14A, and sets stop of the operation reception via the operator 12 according to the operation stop instruction received in step S1 (step S21). In step S21, for example, there is displayed on the display 14A the display screen replacing the dialog 91 in the display screen 90 shown in FIG. 11 with "under communication" as the display screen information. The background of the dialog 91 is not limited to the display screen of the settlement mode.

The CPU 11 receives the arrival execution information indicating the arrival execution or leaving execution information indicating leaving execution from the mobile terminal 20 via the short-distance communicator 16 (step S22). Step S23 is similar to step S8. The date and time information in step S23 is date and time information at the time of arrival execution or at the time of leaving execution. In steps S21 to S23, the CPU 11 obtains date and time information for display in after-mentioned arrival execution input screen information and leaving execution screen information from the time counter 19 as needed (for example, every one minute), and transmits the date and time information for display to the mobile terminal 20 via the short-distance communicator 16.

Next, with reference to FIGS. 8 and 9, the arrival/leaving input processing executed in the mobile terminal 20 will be described. The arrival/leaving input processing is processing of obtaining information regarding arrival/leaving and stock report by input and reception from the ECR 10, and registering the arrival/leaving and the stock report in the server 30 by using the obtained information.

In the mobile terminal 20, for example, the CPU 21 executes the arrival/leaving input processing in cooperation with the arrival/leaving input program P2 which was read out from the storage 25 and loaded onto the RAM 23 appropriately in response to the input of execution instruction of the arrival/leaving input processing by the employee via the operator 22 as a trigger.

As shown in FIG. 8, first, the CPU 21 transmits the request for mode information to the ECR 10 via the short-distance communicator 26, corresponding to step S1 of the arrival/leaving input processing of FIG. 7, and receives the mode information from the ECR 10 via the short-distance communicator 26, corresponding to step S3 in FIG. 7 (step S30).

The CPU 21 displays the employee number input screen information on the display 24, and receives input of the employee number by the employee via the operator 22 (step S31). In step S31, for example, the employee number input screen 100 shown in FIG. 12A is displayed. The employee number input screen 100 has an employee number display area 101 and a soft key area 102. The employee number display area 101 is a display area of the input employee number. The soft key area 102 is a touch input area having a group of numerical soft keys (ten key). The employee number is input by touch input of each key in the soft key area 102 by the employee.

The CPU 21 transmits the employee number input in step S31 to the server 30 via the mobile communicator 27, and receives stock report necessity/unnecessity information indicating necessity/unnecessity of stock report of the employee of the present employee number (that is, whether the employee is a manager) from the server 30 (step S32). The CPU 21 determines whether the stock report is necessary on the basis of the stock report necessity/unnecessity information which was received in step S32 (step S33).

If the stock report is necessary (step S33; YES), the CPU 21 determines whether the mode information received in step S30 indicates the settlement mode (step S34). If the mode information does not indicate the settlement mode (step S34; NO), the arrival/leaving input processing ends since the employee is a manager and the ECR 10 is in a mode other than the settlement mode.

If the mode information indicates the settlement mode (step S34; YES), the CPU 21 displays the arrival/leaving selection input screen information on the display 24 (step S35). In step S35, the arrival/leaving selection input screen 110 shown in FIG. 12B is displayed no the display 24 as the arrival/leaving selection input screen information, for example. The arrival/leaving selection input screen 110 has an arrival button 111, a leaving button 112 and stock report necessity messages 113 and 114. The arrival button 111 is a button for receiving the touch input of selection of (shift to) the arrival processing mode. The leaving button 112 is a button for receiving touch input of selection of (shift to) the leaving processing mode. The stock report necessity message 113 is a message indicating that the stock report at the time of arrival is necessary. The stock report necessity message 114 is a message indicating that the stock report at the time of leaving is necessary. The arrival processing mode or the leaving processing mode is selected and input by touch input of the arrival button 111 or the leaving button 112 by the employee, respectively.

The CPU 21 determines whether touch input was performed to the arrival button 111 to select the arrival processing mode via the operator 22 (step S36A). If the arrival processing mode is not selected (step S36A; NO), the CPU 21 determines whether touch input was performed to the leaving button 112 to select the leaving processing mode via the operator 22 (step S36B). If the leaving processing mode is not selected (step S36B; NO), the CPU 21 proceeds to step S35.

If the arrival processing mode is selected (step S36A; YES), the CPU 21 proceeds to the arrival processing mode, generates the stock report necessity information and the operation stop instruction, corresponding to step S1 in FIG. 7, and transmits the stock report necessity information, the arrival/leaving identification information indicating arrival and the operation stop instruction to the ECR 10 via the short-distance communicator 26 (step S37).

The CPU 21 displays the arrival execution input screen information on the display 24, and receives input of a predetermined operation timing by the employee as the arrival execution (decision of arrival date and time information) via the operator 22 (step S38). In step S38, there is displayed on the display 24 the arrival execution input screen 120 shown in FIG. 13A as the arrival execution input screen information, for example. The arrival execution input screen 120 has an arrival execution message 121, an OK button 122, and date and time information 123. The arrival execution message 121 is a message of inquiring whether to perform arrival execution (decision of arrival date and time). The OK button 122 is a button for receiving the touch input of arrival execution. The arrival execution is input by touch input of OK button 122 by the employee.

The date and time information 123 is current date and time information. In step S38, the CPU 11 receives date and time information for display transmitted from the ECR 10, corresponding to steps S6 and S7 in FIG. 7 via the short-distance communicator 26 as needed, and displays the received date and time information on the date and time information 123 to update the information to the latest date and time information as time passes.

The CPU 21 generates arrival execution information to transmit the arrival execution information to the ECR 10 via the short-distance communicator 26, corresponding to step S7 in FIG. 7 (step S39). The CPU 21 receives the store number, the device number and the date and time information from the ECR 10 via the short-distance communicator 26, corresponding to step S8 in FIG. 7 (step S40).

The CPU 21 transmits the employee number input in step S31 and the store number, the device number and the date and time information received in step S40, and the arrival/leaving identification information indicating arrival which was generated in step S39 to the server 30 via the mobile communicator 27 (step S41). The date and time information of step S41 is the date and time information at the time of arrival execution.

The CPU 21 transmits the drawer release instruction to the ECR 10 via the short-distance communicator 26, corresponding to step S9 in FIG. 7 (step S42). The CPU 21 displays stock input screen information on the display 24, and receives input of stock basic information in the drawer 18 by the employee via the operator 22 (step S43). The stock basic information is information on the number of each type of moneys and merchandise coupons in the drawer 18. In step S43, for example, the stock input screen 130 shown in FIG. 13B is displayed on the display 24 as the stock input screen information. The stock input screen 130 has a number input area 131, an OK button 132 and date and time information 133. The number input area 131 is an area for receiving input of the number of each type of moneys of one-yen coin to ten thousand-yen bill and the number of merchandise coupons. The OK button 132 is a button for receiving touch input of completion of stock input. The stock basic information is input by input of the stock (the number of each type of moneys and merchandise coupons) to the number input area 131 and touch input of the OK button 132 by the employee (manager).

The date and time information 133 is the current date and time information. In step S43, the CPU 11 receives as needed date and time information for display transmitted from the ECR 10, corresponding to steps S9 and S10 in FIG. 7, via the short-distance communicator 26, and displays the received date and time information in the date and time information 133 to update the information to the latest date and time information as time passes.

The CPU 21 generates stock report information corresponding to the stock basic information which was input in step S43, and transmits the employee number input in step S31 and the generated stock report information to the ECR 10 via the short-distance communicator 26, corresponding to step S10 in FIG. 7 (step S44). The generated stock report information has a stock report total value which is a total value of the amounts of money for all types of moneys and merchandise coupons, a cash stock report value which is a total value of the amounts of money for all types of moneys, a merchandise coupon stock report value which is a total value of the amounts of money for the merchandise coupons, and the number of each type of moneys and merchandise coupons (stock basic information).

The CPU 21 receives the current date and time information as the stock report time on arrival and the logical stock information from the ECR 10 via the short-distance communicator 26, corresponding to step S11 in FIG. 7 (step S45).

The CPU 21 transmits the employee number which was input in step S31, the store number and the device number which were received in step S40, the date and time information and the logical stock information which were received in step S45 and the stock report information which was generated in step S44 to the server 30 via the mobile communicator 27 (step S46).

The CPU 21 displays the arrival completion screen information on the display 24, generates an operation restart instruction, corresponding to step S12 in FIG. 7, and transmits the operation restart instruction to the ECR 10 via the short-distance communicator 26 (step S47). Then, the CPU 21 ends the arrival/leaving input processing. In step S47, for example, the arrival completion screen 140 shown in FIG. 14A is displayed. The arrival completion screen 140 has an arrival completion message 141 and an arrival date and time area 142. The arrival completion message 141 is a message indicating completion of arrival. The arrival date and time area 142 is a display area of arrival date and time, and the date and time information which was received in step S40 is displayed in the arrival date and time area 142.

In a case where the leaving processing mode is selected (step S36B; YES), the CPU 21 proceeds to the leaving processing mode, generates stock report necessity information, a drawer release instruction and an operation stop instruction, corresponding to step S1 in FIG. 7, and transmits the stock report necessity information, the arrival/leaving identification information indicating leaving, the drawer release instruction and the operation stop instruction to the ECR 10 via the short-distance communicator 26 (step S48). Steps S49 and S50 are similar to steps S43 and S44.

In step S49, for example, the stock input screen 130A shown in FIG. 14B is displayed on the display 24 as stock input screen information. The stock input screen 130A has a number input area 131, an OK button 132 and date and time information 133 similarly to the stock input screen 130. In step S49, the CPU 11 receives as needed date and time information for display which was transmitted from the ECR 10, corresponding to steps S14 to S16 in FIG. 7, via the short-distance communicator 26, and displays the received date and time information in the date and time information 133 to update the date and time information to latest date and time information as time passes.

Step S50 corresponds to step S16 in FIG. 7. The CPU 21 receives the store number, the device number, the date and time information and logical stock information from the ECR 10 via the short-distance communicator 26, corresponding to step S17 in FIG. 7 (step S51). Step S52 is similar to step S46.

The CPU 21 generates report information including the employee number input in step S31, the store number, the device number, the date and time information and the logical stock information received in step S51 and the stock report information generated in step S50, and transmits the generated report information to the ECR 10 via the short-distance communicator 26 to cause the ECR 10 to print the report (step S53). Step S53 corresponds to step S18 in FIG. 7. In step S18, the report 200 shown in FIG. 15A is printed, for example. The report 200 includes date and time information 201 at the time of stock report, the store number 202, the device number 203, the employee number 204, the logical stock information 205 and the stock report information 206.

The CPU 21 displays report issue completion screen information on the display 24 (step S54). In step S54, for example, the report issue completion screen 150 shown in FIG. 15B as the report issue completion screen information is displayed on the display 24, for example. The report issue completion screen 150 has a report issue completion message 151 and an OK button 152. The report issue completion message 151 is a message indicating completion of report issue (printing). The OK button 152 is a button for receiving touch input of confirmation of report issue completion. In step S54, the confirmation of report issue completion ends by the touch input of the OK button 132 by the employee (manager).

The CPU 21 displays the leaving execution input screen information on the display 24, and receives input of a predetermined operation timing by the employee as the leaving execution (decision of leaving date and time information) via the operator 22 (step S55). In step S55, for example, the leaving execution input screen 160 shown in FIG. 16A is displayed on the display 24 as the leaving execution input screen information. The leaving execution input screen 160 has a leaving execution message 161, an OK button 162 and date and time information 163. The leaving execution message 161 is a message of inquiring whether to perform leaving execution (decision of leaving date and time). The OK button 162 is a button for receiving touch input of leaving execution. The leaving execution is input by touch input of the OK button 162 by the employee.

The date and time information 163 is current date and time information. In step S55, the CPU 11 receives as needed date and time information for display which was transmitted from the ECR 10, corresponding to step S19 in FIG. 7, via the short-distance communicator 26, and displays the received date and time information in the date and time information 163 to update the date and time information to latest date and time information as time passes.

The CPU 21 transmits the leaving execution information to the ECR 10, corresponding to step S19 in FIG. 7 (step S56). The CPU 21 receives the current date and time information from the ECR 10, corresponding to step S20 in FIG. 7 (step S57).

The CPU 21 transmits the employee number input in step S31, the store number and the device number received in step S51, the date and time information received in step S57 and the arrival/leaving identification information indicating leaving generated in step S48 to the server 30 via the mobile communicator 27 (step S58). The date and time information in step S58 is date and time information at the time of leaving execution.

The CPU 21 displays the leaving completion screen information on the display 24, generates an operation restart instruction, corresponding to step S12 in FIG. 7, and transmits the operation restart instruction to the ECR 10 via the short-distance communicator 26 (step S59). The CPU 21 ends the arrival/leaving input processing. In step S59, for example, the leaving completion screen 170 shown in FIG. 16B is displayed on the display 24 as the leaving completion screen information. The leaving completion screen 170 has a leaving completion message 171 and a leaving date and time area 172. The leaving completion message 171 is a message indicating completion of leaving. The leaving date and time area 172 is a display area of the leaving date and time, and the date and time information received in step S57 is displayed in the leaving date and time area 172.

If the stock report is not necessary (step S33; NO), as shown in FIG. 9, the CPU 21 displays arrival/leaving selection input screen information on the display 24 (step S60). In step S60, for example, the arrival/leaving selection input screen 180 shown in FIG. 17 is displayed on the display 24 as the arrival/leaving selection input screen information. The arrival/leaving selection input screen 180 has an arrival button 181 and a leaving button 182. The arrival button 181 is a button for receiving touch input of selection of (shift to) the arrival processing mode. The leaving button 182 is a button for receiving touch input of selection of (shift to) the leaving processing mode. The arrival processing mode or the leaving processing mode is selected to be input by touch input of the arrival button 181 or the leaving button 182 by the employee, respectively.

Steps S61A and S61B are similar to steps S36A and S36B. The CPU 21 generates stock report unnecessity information and the operation stop instruction, corresponding to step S1 in FIG. 7, and transmits the stock report unnecessity information and the operation stop instruction to the ECR 10 via the short-distance communicator 26 (step S62). Step S63 is similar to step S38. The CPU 21 generates the arrival execution information indicating arrival, corresponding to step S22 in FIG. 7, and transmits the arrival execution information to the ECR 10 via the short-distance communicator 26 (step S64). The CPU 21 receives the store number, the device number and the date and time information from the ECR 10 via the short-distance communicator 26, corresponding to step S23 in FIG. 7 (step S65).

Steps S66 and S67 are similar to steps S41 and S47. Steps S68 and S69 are similar to steps S62 and S63. The CPU 21 generates leaving execution information indicating leaving, corresponding to step S22 in FIG. 7, and transmits the leaving execution information to the ECR 10 via the short-distance communicator 26 (step S70). Steps S71 to S73 are similar to steps S65, S66 and S59.

Next, with reference to FIG. 10, the arrival/leaving registration processing which is executed in the server 30 will be described. The arrival/leaving registration processing is processing of receiving information regarding arrival/leaving and stock report from the mobile terminal 20 and registering the information.

In the server 30, for example, the CPU 31 executes the arrival/leaving registration processing in cooperation with the arrival/leaving registration program P3 which was read out from the storage 35 and loaded onto the RAM 33 as needed, in response to start of reception of information via the communicator 36 from the mobile terminal 20 as a trigger.

As shown in FIG. 10, first, the CPU 31 completes reception of information from the mobile terminal 20 via the communicator 36 (step S81). The information received in step S81 is any one of the employee number corresponding to step S32 of the arrival/leaving input processing in FIG. 8, the employee number, the store number, the device number, the date and time information and the arrival/leaving identification information corresponding to steps S41, S58, S66 and S72 in FIGS. 8 and 9, and the employee number, the store number, the device number, the date and time information, the logical stock information and the stock report information corresponding to steps S46 and S52 in FIG. 8.

The CPU 31 determines whether the information received in step S81 is only the employee number (step S82). If the received information is only the employee number (step S82; YES), the CPU 31 reads out the employee information table 50 from the storage 35 and obtains, as the stock report necessity/unnecessity information, the stock report necessity/unnecessity 52 corresponding to the employee number 51 which was received in step S81 (step S83).

The CPU 31 transmits the stock report necessity/unnecessity information of the stock report necessity/unnecessity 52 obtained in step S83 to the mobile terminal 20 via the communicator 36, corresponding to step S32 in FIG. 8 (step S84), and ends the arrival/leaving registration processing.

If the received information is not only the employee number (step S82; NO), the CPU 31 stores the information received in step S81 in the storage 35 (step S85). In step S85, when the employee number, the store number, the device number, the date and time information and the arrival/leaving identification information are received, the employee number, the store number, the device number, the date and time information and the arrival/leaving identification information are respectively added to the same record of the employee number 61, the store number 62, the device number 63, the arrival/leaving date and time 64 and the arrival/leaving identification information 65 in the arrival/leaving information table 60 of the storage 35. When the employee number, the store number, the device number, the date and time information, the logical stock information and the stock report information are received, the employee number, the store number, the device number, the date and time information, the logical stock information and the stock report information are respectively added to the same record of the employ number 71, the store number 72, the device number 73, the report date and time 74, the logical stock information 75 and the stock report information 76 in the stock information table 70 of the storage 35.

The CPU 31 determines whether the stock report information is included in the information received in step S81 (step S86). If the stock report information is not included in the received information (step S86; NO), the arrival/leaving registration processing ends. If the stock report information is included in the received information (step S86; YES), the CPU 31 calculates the difference between the stock report total value of the stock report information and the logical stock total value of the logical stock information included in the information received in step 81 (step S87).

The CPU 31 determines whether the difference between the stock report total value and the logical stock total value calculated in step S87 is a predetermined value, which was set in advance, or more (step S88). If the difference is less than the predetermined value (step S88; NO), the arrival/leaving registration processing ends. If the difference is the predetermined value or more (step S88; YES), the CPU 31 reads out the email address of the owner from the storage 35, generates alarm information including the employee number, the store number, the device number, the date and time information (report date and time), the logical stock information and the stock report information stored in step S81, for example, and indicating that the difference between the stock report total value and the logical stock total value is the predetermined value or more, transmits the alarm information via email to the email address of the owner via the communicator 36 (step S89), and ends the arrival/leaving registration processing. The owner receives the email of the alarm information by a mobile terminal or a PC owned by the owner himself/herself and checks the contents of the alarm information.

As described above, according to the embodiment, the attendance management system 1 includes a mobile terminal 20 which displays an arrival execution input screen or a leaving execution input screen for receiving a predetermined operation timing by an employee as arrival date and time or leaving date and time, and displays a stock input screen for a user to input stock in the ECR 10. The mobile terminal 20 displays the arrival execution input screen prior to display of the stock input screen when an arrival processing mode is selected, and displays the leaving execution input screen after display of the stock input screen when a leaving processing mode is selected.

In the attendance management system 1, the mobile terminal 20 displays the arrival execution input screen or the leaving execution input screen as the display screen in the mobile terminal 20 which is communicably connected to the predetermined ECR 10, and the mobile terminal 20 displays the stock input screen in the ECR 10 as the display screen.

Thus, the employee inputs stock (stock basic information) following the input of the arrival date and time (arrival execution). In addition, a first employee is prevented from requesting another person to pretend to arrive as the first employee since, when the another person such as a second employee pretends to arrive or leave as the first employee, the another person also performs stock input corresponding to the arrival or leaving, and the first employee is responsible for the error or injustice of the stock input by the another person. Thus, it is possible to prevent another person from pretending to arrive or leave as the first employee in the workplace in which the ECR 10 is installed. It is also possible to prevent the first employee from working extra hours since the input processing of stock by the first employee before input of the arrival date and time or after input of the leaving date and time is prevented. Furthermore, since the arrival execution input screen, the leaving execution input screen and the stock input screen are displayed and information is input on the mobile terminal 20 side, it is possible to avoid providing the components enabling display of the arrival execution input screen, the leaving execution input screen and the stock input screen and input of information on the ECR side, which can reduce the processing load on the ECR 10 and the cost.

The attendance management system 1 includes a server 30 in which the attendance information is registered, the attendance information being information in which the information on stock and the information on the arrival date and time or the leaving date and time input by the employee are associated with the device number for identifying the ECR 10. Thus, it is possible to manage the information on the arrival date and time, the leaving date and time and the stock in the server 30 and reduce the processing load of information management on the ECR 10 and the mobile terminal 20. Furthermore, the server 30 can manage the information on the arrival date and time, the leaving date and time and the stock across a plurality of ECRs 10.

The attendance information to be registered in the server 30 is transmitted to the server 30 from the mobile terminal 20. Thus, since the ECR 10 does not need to include a communicator which communicates with the server 30, it is possible to reduce the processing load on the ECR 10 and cost for communication.

The above description in the embodiment is an example of the attendance management device, the attendance management system, the attendance management method and the recording medium according to the present invention, and the present invention is not limited to this.

For example, though the ECR 10 having the display 14A with a large display screen is used as the sales data processing device in the embodiment, the present invention is not limited to this.

Figure 18:
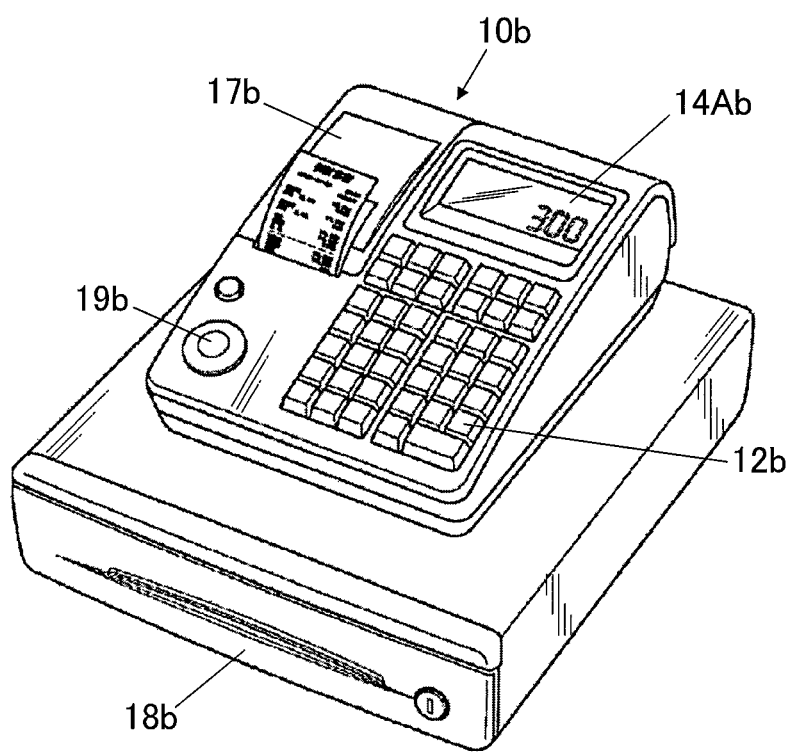
FIG. 18 is an outer view of a second ECR.

The configuration using the ECR 10b shown in FIG. 18 may be used as the sales data processing device. FIG. 18 is an outer view of the ECR 10b. As shown in FIG. 18, the ECR 10b includes an operator 12b formed of hard keys, a display 14Ab, a printer 17b, a drawer 18b and a mode switch 19b for switching various modes such as a settlement mode by a mode key (not shown in the drawings) being inserted and rotated. The display 14Ab has a display capable of segment display and display of a small amount of characters with a display screen which is small compared to that of the ECR 10b. The main display information is displayed on the mobile terminal 20, and simple display information such as "preparing for opening" and "under communication" is displayed on the display of the ECR. Thus, the ECR 10b can be used instead of the ECR 10. By this configuration, it is possible to reduce the cost of the arrival/leaving system and simplify the configuration.

Though a single ECR 10 is installed in each store in the embodiment, the present invention is not limited to this. For example, a plurality of ECRs 10 may be installed in each store.

In the embodiment, it is configured to perform display of a arrival execution input screen 120 and input of arrival execution (arrival date and time), and display of a stock input screen 130 and input of stock basic information after display of the employee number input screen 100 and input of the employee number are performed in the mobile terminal 20. However, the present invention is not limited to this. For example, in a case where all the employees perform stock report, the display of the employee number input screen 100 and the employee number input may be performed after display of the arrival execution input screen 120 and input of the arrival execution are performed in the mobile terminal 20. In a case where the mobile terminal 20 transmits information regarding arrival execution and stock together to the server 30, it may be configured to display the employee number input screen 100 to perform the employee number input and perform the employee number transmission with the information regarding arrival execution and stock to the server 30 after display of the stock input screen 130 and input of the stock basic information. As for the leaving, similarly, in a case where all the employees perform stock report, for example, the mobile terminal 20 may display the employee number input screen 10 and perform the employee number input after display of the stock input screen 130A and input of the stock basic information. In a case where the mobile terminal 20 transmits the information regarding the stock report and the leaving execution together to the server 30, it may be configured to display the employee number input screen 100 to perform the employee number input and perform employee number transmission with the information regarding the arrival execution and the stock to the server 30 after display of the leaving execution input screen 160 and input of the leaving execution.

Though the attendance management system 1 in the embodiment is configured by including the ECR 10, the mobile terminal 20 and the server 30, the present invention is not limited to this. The attendance management system 1 may be configured by including the mobile terminal 20 and the server 30, and the ECR 10 may be a predetermined external terminal.

Though the ECR 10 is described as an example of the sales data processing device in the attendance management system 1 in the embodiment, the attendance management system 1 does not necessarily need to include the sales data processing device. For example, the attendance management system 1 may include a drawer device for merely storing the received moneys, which does not perform sales data processing. The physical configuration of the drawer device may be similar to the configuration described in FIG. 3.

It goes without saying that the detailed configuration and the detailed operation of the components in the attendance management system 1 described in the embodiment may be appropriately changed within the scope of the present invention.

Although embodiments of the present invention have been described, the scope of the present invention is not limited to the above described embodiments and includes the scope of the present invention that is described in the claims and the equivalents thereof.

What is claimed is:

1. An attendance management device comprising:
a processor configured to:
  instruct a display to display a date and time reception screen requesting input of a predetermined operation timing by a user as arrival date and time or leaving date and time;
  receive the input of the predetermined operation timing;
  instruct the display to display a stock input screen requesting input of information on a stock of a drawer provided in a predetermined sales data processing device or a predetermined drawer device; and
  receive the input of the information on the stock of the drawer,
  wherein the processor is configured to:
    receive arrival/leaving identification information indicating one of the user is arriving relative to the predetermined sales data processing device or the predetermined drawer device, and the user is leaving relative to the predetermined sales data processing device or the predetermined drawer device;
    in response to receiving the arrival/leaving identification information that indicates that the user is arriving relative to the predetermined sales data processing device or the predetermined drawer device, enter an arrival processing mode in which the processor is configured to instruct the display to display the date and time reception screen and receive the input of the predetermined operation timing prior to instructing the display to display the stock input screen and receiving the input of the information on the stock of the drawer; and in response to receiving the arrival/leaving identification information that indicates that the user is leaving relative to the predetermined sales data processing device or the predetermined drawer device, enter a leaving processing mode in which the processor is configured to instruct the display to display the date and time reception screen and receive the input of the predetermined operation timing after instructing the display to display the stock input screen and receiving the input of the information on the stock.

2. The attendance management device according to claim 1, wherein the processor is configured to transmit, to a predetermined server, attendance information in which the information on the stock of the drawer received and information on the arrival date and time or the leaving date and time are associated with identification information for identifying the predetermined sales data processing device or the predetermined drawer device.

3. The attendance management device according to claim 1, wherein the processor is configured to:

determine whether or not receiving the input of the information on the stock of the drawer is required based on user information which is stored in association with the user;

in response to receiving the arrival/leaving identification information that indicates that the user is arriving relative to the predetermined sales data processing device or the predetermined drawer device and determining that receiving the input of the information on the stock of the drawer is required, enter the arrival processing mode; and in response to receiving the arrival/leaving identification information that indicates that the user is leaving relative to the predetermined sales data processing device or the predetermined drawer device and determining that receiving the input of the information on the stock of the drawer is required, enter the leaving processing mode.

4. The attendance management device according to claim 1, wherein the processor is configured to:

control the drawer to release;

in entering the arrival processing mode, instruct the display to display the date and time reception screen and receive the input of the predetermined operation timing prior to controlling the drawer to release and receiving the input of the information on the stock of the drawer; and in entering the leaving processing mode, instruct the display to display the date and time reception screen after controlling the drawer to release and receiving the input of the information on the stock of the drawer.

5. The attendance management device according to claim 1, wherein the processor is configured to, in entering the leaving processing mode, instruct a printer to print the information on the stock of the drawer received.

6. The attendance management device according to claim 1, wherein the processor is configured to, in entering the leaving processing mode:

instruct a printer to print:
the information on the stock of the drawer received;
user information for identifying the user; and
identification information for identifying the predetermined sales data processing device or the predetermined drawer device.

7. The attendance management device according to claim 1, wherein the processor is configured to:

prior to instructing the display to display the date and time reception screen and the stock input screen, instruct the display to display a user information input screen requesting input of user information for identifying the user; and receive the input of the user information.

8. The attendance management device according to claim 1, wherein the stock input screen is a screen requesting input of a number of each type of money as the information on the stock of the drawer.

9. The attendance management device according to claim 1, wherein the stock input screen is a screen requesting input of a number of a merchandise coupon as the information on the stock of the drawer.

10. An attendance management system comprising:
a mobile terminal comprising a display; and
a server configured to:

instruct the display to display a date and time reception screen requesting input of a predetermined operation timing by a user as arrival date and time or leaving date and time;

receive the input of the predetermined operation timing;

instruct the display to display a stock input screen requesting input of information on a stock of a drawer provided in a predetermined sales data processing device or a predetermined drawer device; and receive the input of the information on the stock of the drawer, wherein the server is configured to:

receive arrival/leaving identification information indicating one of the user is arriving relative to the predetermined sales data processing device or the predetermined drawer device, and the user is leaving relative to the predetermined sales data processing device or the predetermined drawer device;

in response to receiving the arrival/leaving identification information that indicates that the user is arriving relative to the predetermined sales data processing device or the predetermined drawer device, enter an arrival processing mode in which the server is configured to instruct the display to display the date and time reception screen and receive the input of the predetermined operation timing prior to instructing the display to display the stock input screen and receiving the input of the information on the stock of the drawer; and in response to receiving the arrival/leaving identification information that indicates that the user is leaving relative to the predetermined sales data processing device or the predetermined drawer device, enter a leaving processing mode in which the server is configured to instruct the display to display the date and time reception screen and receive the input of the predetermined operation timing after instructing the display to display the stock input screen and receiving the input of the information on the stock of the drawer.

11. The attendance management system according to claim 10,
wherein the server is configured to register attendance information in which the information on the stock of the drawer received and information on the arrival date and time or the leaving date and time are associated with identification information for identifying the predetermined sales data processing device or the predetermined drawer device.

12. The attendance management system according to claim 11,
wherein the mobile terminal is configured to transmit the attendance information to be registered in the server to the server.

13. An attendance management method comprising:
instructing a display to display a date and time reception screen requesting input of a predetermined operation timing by a user as arrival date and time or leaving date and time;
receiving the input of the predetermined operation timing;
instructing the display to display a stock input screen requesting input of information on a stock of a drawer provided in a predetermined sales data processing device or a predetermined drawer device; and
receiving the input of the information on the stock of the drawer; and
receiving arrival/leaving identification information indicating one of the user is arriving relative to the predetermined sales data processing device or the predetermined drawer device, and the user is leaving relative to the predetermined sales data processing device or the predetermined drawer device,
wherein in response to receiving the arrival/leaving identification information that indicates that the user is arriving relative to the predetermined sales data processing device or the predetermined drawer device, entering an arrival processing mode comprising instructing the display to display the date and time reception screen and receiving the input of the predetermined operation timing prior to instructing the display to display the stock input screen and receiving the input of the information on the stock of the drawer, and
wherein in response to receiving the arrival/leaving identification information that indicates that the user is leaving relative to the predetermined sales data processing device or the predetermined drawer device, entering a leaving processing mode comprising instructing the display to display the date and time reception screen and receiving the input of the predetermined operation timing after instructing the display to display the stock input screen and receiving the input of the information on the stock of the drawer.

14. A non-transitory computer readable storage medium storing a program that causes a computer to at least perform:
instructing a display to display a date and time reception screen requesting input of a predetermined operation timing by a user as arrival date and time or leaving date and time;
receiving the input of the predetermined operation timing;
instructing the display to display a stock input screen requesting input of information on a stock of a drawer provided in a predetermined sales data processing device or a predetermined drawer device; and
receiving the input of the information on the stock of the drawer; and
receiving arrival/leaving identification information indicating one of the user is arriving relative to the predetermined sales data processing device or the predetermined drawer device, and the user is leaving relative to the predetermined sales data processing device or the predetermined drawer device,
wherein in response to receiving the arrival/leaving identification information that indicates that the user is arriving relative to the predetermined sales data processing device or the predetermined drawer device, entering an arrival processing mode comprising instructing the display to display the date and time reception screen and receiving the input of the predetermined operation timing prior to instructing the display to display the stock input screen and receiving the input of the information on the stock of the drawer, and
wherein in response to receiving the arrival/leaving identification information that indicates that the user is leaving relative to the predetermined sales data processing device or the predetermined drawer device, entering a leaving processing mode comprising instructing the display to display the date and time reception screen and receiving the input of the predetermined operation timing after instructing the display to display the stock input screen and receiving the input of the information on the stock of the drawer.

* * * * *

UNITED STATES PATENT AND TRADEMARK OFFICE
CERTIFICATE OF CORRECTION

PATENT NO. : 10,832,494 B2
APPLICATION NO. : 16/000964
DATED : November 10, 2020
INVENTOR(S) : Katsuyuki Itakura It is certified that error appears in the above-identified patent and that said Letters Patent is hereby corrected as shown below:

On the Title Page

Item (30), should read:
(30) Foreign Application Priority Data
June 6, 2017 (JP)................ 2017-111291

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*